(12) United States Patent
Li et al.

(10) Patent No.: US 12,729,998 B2
(45) Date of Patent: Sep. 8, 2026

(54) METHOD AND SYSTEM FOR CORRECTING IMBALANCE IN IN-PHASE/QUADRATURE DEMODULATION OF OPTICAL FIBER DAS DATA

(71) Applicants: China National Petroleum Corporation, Beijing (CN); BGP Inc., China National Petroleum Corporation, Hebei (CN)

(72) Inventors: Yanpeng Li, Hebei (CN); Shaohua Zhang, Hebei (CN); Fei Li, Hebei (CN)

(73) Assignees: China National Petroleum Corporation, Beijing (CN); BGP Inc., China National Petroleum Corporation, Hebei (CN)

( * ) Notice: Subject to any disclaimer, the term of this patent is extended or adjusted under 35 U.S.C. 154(b) by 325 days.

(21) Appl. No.: 18/576,554

(22) PCT Filed: Jun. 30, 2022

(86) PCT No.: PCT/CN2022/102882

§ 371 (c)(1),
(2) Date: Jan. 4, 2024

(87) PCT Pub. No.: WO2023/123968

PCT Pub. Date: Jul. 6, 2023

(65) Prior Publication Data

US 2024/0337525 A1 Oct. 10, 2024

(30) Foreign Application Priority Data

Dec. 30, 2021 (CN) ......................... 202111645744.5

(51) Int. Cl.
*G01H 9/00* (2006.01)
*G01V 1/36* (2006.01)

(52) U.S. Cl.
CPC ............... *G01H 9/004* (2013.01); *G01V 1/36* (2013.01); *G01V 2210/30* (2013.01)

(58) Field of Classification Search
CPC ............................ G01V 1/36; G01V 2210/30
See application file for complete search history.

(56) References Cited

U.S. PATENT DOCUMENTS 5,705,949 A * 1/1998 Alelyunas ............. H03D 3/009 329/304
6,035,004 A 3/2000 Nakata
(Continued)

FOREIGN PATENT DOCUMENTS

CN 102437983 A 5/2012
CN 104486272 A 4/2015
(Continued)

OTHER PUBLICATIONS

Qi, et al., "Impact of I/Q imbalance on the performance of the two-way CSI-assisted AF relaying", 2013 IEEE Wireless Communications and Networking Conference (WCNC): PHY, pp. 2507-2512 (7 Pages total).
(Continued)

*Primary Examiner* — Sung H Pak
(74) *Attorney, Agent, or Firm* — Sughrue Mion, PLLC

(57) ABSTRACT

A method for correcting imbalance in IQ demodulation of optical fiber DAS data is disclosed. The method includes obtaining I/Q signals I0 and Q0 of each sampling on an optical fiber from a DAS acquisition instrument; performing DC bias correction on the I/Q signals I0 and Q0 to obtain I/Q signals I1 and Q1 after DC bias correction; performing amplitude imbalance correction on the I/Q signals I1 and Q1 after DC bias correction by using Hilbert transform to obtain I/Q signals I2 and Q2 after amplitude imbalance correction; and performing phase imbalance correction on the I/Q signals I2 and Q2 after amplitude imbalance correction by
(Continued)

using Hilbert transform to obtain I/Q signals I3 and Q3 after phase imbalance correction. It is possible to perform accurate correction on I/Q signals, accurately and efficiently suppress optical fiber demodulation noise, and improve optical fiber DAS data acquisition quality.

9 Claims, 6 Drawing Sheets

(56) References Cited

U.S. PATENT DOCUMENTS

| | | | |
|---|---|---|---|
| 6,449,321 B1 | 9/2002 | Gustafsson et al. | |
| 8,014,444 B1 | 9/2011 | Marino | |
| 10,601,630 B1 | 3/2020 | Dickerman et al. | |
| 2005/0157815 A1 | 7/2005 | Kim et al. | |
| 2020/0209020 A1* | 7/2020 | Issa | G01H 9/004 |

FOREIGN PATENT DOCUMENTS

| | | |
|---|---|---|
| CN | 105610760 A | 5/2016 |
| CN | 111678584 A | 9/2020 |
| JP | 2014-053687 A | 3/2014 |

OTHER PUBLICATIONS

Lu Gang et al., "Calibration of Amplitude and Phase Inconsistency of I/Q Channels in Wideband Digital Receiver", Radar Science and Technology, 2005, pp. 244-247, vol. 3, No. 4.
Yuan Junquan et al., "New method for correction of quadrature demodulation errors based on statistic average", Systems Engineering and Electronics, 2005, pp. 1219-1221, vol. 27, No. 7.
Xu, Bin et al., "Non-official translation: Influence and Correction of Quadrature Modulation and Demodulation Non-ideal Characteristics on Digital Predistortion", Science and Technology Advisory Herald, 2007, pp. 52-53, No. 5.
Zou Shiyuan et al., "Research of Compensating Zero-IF Modulator IQ Imbalance in Digital Domain", Video Engineering, 2013, pp. 163-166, vol. 37, No. 23.
Zhang Zhigang et al., "Calibration method and experiment based on I/Q demodulation principle", Nuclear Techniques, 2015, pp. 030102-1-6, vol. 38, No. 3.
International Search Report of PCT/CN2022/102882 dated Sep. 7, 2022 [PCT/ISA/210].

* cited by examiner

METHOD AND SYSTEM FOR CORRECTING IMBALANCE IN IN-PHASE/QUADRATURE DEMODULATION OF OPTICAL FIBER DAS DATA

CROSS REFERENCE TO RELATED APPLICATIONS

This application is a National Stage of International Application No. PCT/CN2022/102882 filed on Jun. 30, 2022, claiming priority based on Chinese Patent Application No. 202111645744.5 filed on Dec. 30, 2021.

FIELD OF THE INVENTION

The present invention relates to the technical field of optical fiber sensing and seismic exploration, and particularly relates to a method and system for correcting imbalance in In-phase/Quadrature (I/Q, or IQ) demodulation of optical fiber DAS data.

BACKGROUND OF THE INVENTION

The optical fiber Distributed Acoustic Sensing (DAS) technology is a revolutionary new technology in which optical fiber is used as both a sensing medium and a transmission medium, and may sense acoustic vibration information around the optical fiber, and the acoustic vibration information is recorded by high-density time and space sampling. The DAS technology is widely applied in seismic data acquisition in wells, dam safety monitoring, perimeter security, pipe monitoring or other aspects. The DAS technology mainly utilizes Rayleigh backscattering (RBS) of laser when laser propagates through the optical fiber. RBS changes accordingly when a medium surrounding the optical fiber vibrates. Seismic wave information of the formation may be obtained by continuously observing and demodulating this optical signal.

The DAS technology generally employs a phase-sensitive Optical Time Domain Reflectometer (φ-OTDR) to obtain RBS phase information by In-phase/Quadrature (I/Q, or IQ) phase demodulation. Due to the inherent errors of an optical fiber sensing device, such as direct current (DC) bias, amplitude imbalance and phase imbalance, output I/Q values vary elliptically on a crossplot, and a demodulation phase exhibits a non-linear relationship with a to-be-measured physical quantity, so that the phase demodulation accuracy is seriously affected, and the phase noise generated thereby is difficult to remove in subsequent signal processing. Therefore, how to achieve high-accuracy DAS phase demodulation becomes an important and difficult task constraining the development of this technology, and many experts at home and abroad work on eliminating such complex interference.

SUMMARY OF THE INVENTION

The present invention provides a method and system for correcting imbalance in IQ demodulation of optical fiber DAS data for the technical problem in the prior art that phase noise is difficult to remove in signal processing. The method is employed to be capable of correcting I/Q signals accurately, suppressing optical fiber demodulation noise accurately and efficiently, and improving optical fiber DAS data acquisition quality.

To achieve the above objective, the present invention, in a first aspect, provides a method for correcting imbalance in IQ demodulation of optical fiber DAS data, including the following steps: obtaining I/Q signals $I_0$ and $Q_0$ of each sampling on an optical fiber; performing DC bias correction on the I/Q signals $I_0$ and $Q_0$ to obtain I/Q signals $I_1$ and $Q_1$ after DC bias correction; performing amplitude imbalance correction on the I/Q signals $I_1$ and $Q_1$ after DC bias correction by using Hilbert transform to obtain I/Q signals $I_2$ and $Q_2$ after amplitude imbalance correction; and performing phase imbalance correction on the I/Q signals $I_2$ and $Q_2$ after amplitude imbalance correction by using Hilbert transform to obtain I/Q signals $I_3$ and $Q_3$ after phase imbalance correction.

Optionally, wherein the step of performing DC bias correction on the I/Q signals $I_0$ and $Q_0$ to obtain I/Q signals $I_1$ and $Q_1$ after DC bias correction comprises: calculating corresponding DC bias factors $D_i$ and $D_q$ according to the I/Q signals $I_0$ and $Q_0$; and performing DC bias correction on the I/Q signals $I_0$ and $Q_0$ by using the DC bias factors $D_i$ and $D_q$ to obtain the I/Q signals $I_1$ and $Q_1$ after DC bias correction.

Optionally, wherein the step of calculating corresponding DC bias factors $D_i$ and $D_q$ according to the I/Q signals $I_0$ and $Q_0$ comprises: calculating the corresponding DC bias factors $D_i$ and $D_q$ according to a mean value of the I/Q signals $I_0$ and $Q_0$ at different time.

Optionally, wherein the step of performing amplitude imbalance correction on the I/Q signals $I_1$ and $Q_1$ after DC bias correction by using Hilbert transform to obtain I/Q signals $I_2$ and $Q_2$ after amplitude imbalance correction comprises: calculating corresponding amplitude imbalance factors $A_i$ and $A_q$ by using Hilbert transform and the I/Q signals $I_1$ and $Q_1$ after DC bias correction; and performing amplitude imbalance correction on the I/Q signals $I_1$ and $Q_1$ after DC bias correction according to the amplitude imbalance factors $A_i$ and $A_q$ to obtain the I/Q signals $I_2$ and $Q_2$ after amplitude imbalance correction.

Optionally, wherein the step of calculating corresponding amplitude imbalance factors $A_i$ and $A_q$ by using Hilbert transform and the I/Q signals $I_1$ and $Q_1$ after DC bias correction comprises: calculating corresponding instantaneous amplitudes of the I/Q signals $I_1$ and $Q_1$ by Hilbert transform; and calculating the corresponding amplitude imbalance factors $A_i$ and $A_q$ according to a mean value of corresponding instantaneous amplitudes at different time.

Optionally, wherein the step of performing phase imbalance correction on the I/Q signals $I_2$ and $Q_2$ after amplitude imbalance correction by using Hilbert transform to obtain I/Q signals $I_3$ and $Q_3$ after phase imbalance correction comprises: calculating phases $\psi_i$ and $\psi_q$ corresponding to the I/Q signals $I_2$ and $Q_2$ by using Hilbert transform and the I/Q signals $I_2$ and $Q_2$ after amplitude imbalance correction; calculating a phase imbalance factor θ according to the phases $\psi_i$ and $\psi_q$ corresponding to the I/Q signals $I_2$ and $Q_2$; and performing phase imbalance correction on the I/Q signals $I_2$ and $Q_2$ after amplitude imbalance correction according to the phase imbalance factor θ to obtain the I/Q signals $I_3$ and $Q_3$ after phase imbalance correction.

Optionally, wherein the step of calculating phases $\psi_i$ and $\psi_q$ corresponding to the I/Q signals $I_2$ and $Q_2$ by using Hilbert transform and the I/Q signals $I_2$ and $Q_2$ after amplitude imbalance correction comprises: obtaining the corresponding phases $\psi_i$ and $\psi_q$ by an arctangent function of a ratio of the I/Q signals $I_2$ and $Q_2$ to the corresponding I/Q signals after Hilbert transform.

Optionally, wherein the step of calculating a phase imbalance factor θ according to the phases $\psi_i$ and $\psi_q$ corresponding to the I/Q signals comprises: determining the phase imbalance factor $\theta$ by using a mean value of differences of the phases $\psi_i$ and $\psi_q$ at different time.

Optionally, wherein performing phase imbalance correction on the I/Q signals $I_2$ and $Q_2$ after amplitude imbalance correction according to the phase imbalance factor $\theta$ by the following manner to obtain the I/Q signals $I_3$ and $Q_3$ after phase imbalance correction:

$$I_3 = I_2;$$

$$Q_3 = \frac{Q_2 - I_2\sin\theta}{\cos\theta}.$$

The present invention, in a second aspect, provides a system for correcting imbalance in IQ demodulation of optical fiber DAS data, which is characterized by including: an obtaining module, configured to obtain I/Q signals $I_0$ and $Q_0$ of each sampling on an optical fiber; a DC bias correction module, configured to perform DC bias correction on the I/Q signals $I_0$ and $Q_0$ to obtain I/Q signals $I_1$ and $Q_1$ after DC bias correction; an amplitude imbalance correction module, configured to perform amplitude imbalance correction on the I/Q signals $I_1$ and $Q_1$ after DC bias correction by using Hilbert transform to obtain I/Q signals $I_2$ and $Q_2$ after amplitude imbalance correction; a phase imbalance correction module, configured to perform phase imbalance correction on the I/Q signals $I_2$ and $Q_2$ after amplitude imbalance correction by using Hilbert transform to obtain I/Q signals $I_3$ and $Q_3$ after phase imbalance correction.

The present invention has at least the following technical effects by the technical solutions provided by the present invention:

According to the method for correcting imbalance in IQ demodulation of optical fiber DAS data, the I/Q signals $I_0$ and $Q_0$ of each sampling (i.e., observation point) on the optical fiber are obtained; DC bias correction is performed on the I/Q signals $I_0$ and $Q_0$ to obtain I/Q signals $I_1$ and $Q_1$ after DC bias correction; then, amplitude imbalance correction is performed on the I/Q signals $I_1$ and $Q_1$ after DC bias correction by using Hilbert transform to obtain I/Q signals $I_2$ and $Q_2$ after amplitude imbalance correction; and subsequently, phase imbalance correction is performed on the I/Q signals $I_2$ and $Q_2$ after amplitude imbalance correction by using Hilbert transform to obtain I/Q signals $I_3$ and $Q_3$ after phase imbalance correction. It is possible to perform accurate correction on I/Q signals, accurately and efficiently suppress optical fiber demodulation noise, and improve optical fiber DAS data acquisition quality by the method provided by the present invention.

Other features and advantages of the present invention will be described in detail in the detailed description of the embodiments below.

BRIEF DESCRIPTION OF DRAWINGS

The drawings are used to provide a further understanding of embodiments of the present invention and constitute a part of this specification, and to explain the embodiments of the present invention together with specific implementation modes, but do not limit the embodiments of the present invention. In the drawings.

DETAILED DESCRIPTION OF THE EMBODIMENTS

The specific implementation modes of the embodiments of the present invention are described in detail below in combination with the drawings. It should be understood that the specific implementation modes described herein are only used for describing and explaining the embodiments of the present invention and are not used for limiting the embodiments of the present invention.

The obtainment, storage, use, processing, or the like of data in the technical solutions of the present application comply with the relevant provisions of national laws and regulations.

Figure 1:
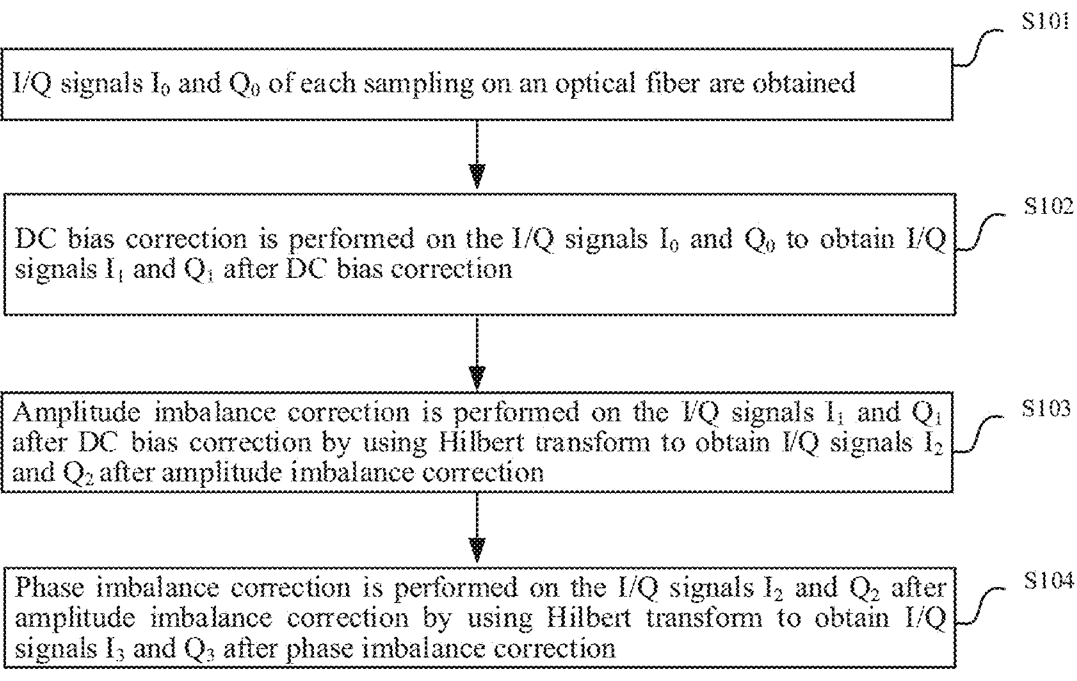
FIG. 1 is a flowchart illustrating a method for correcting imbalance in IQ demodulation of optical fiber DAS data according to an embodiment of the present invention.

Referring to FIG. 1, the present invention, in a first aspect, provides a method for correcting imbalance in IQ demodulation of optical fiber DAS data, including the following steps.

S101: I/Q signals $I_0$ and $Q_0$ of each sampling on an optical fiber are obtained.

Specifically, in an embodiment of the present invention, an optical fiber DAS acquisition instrument is connected to an optical fiber coupled to a to-be-measured object, and I/Q signals $I_0$ and $Q_0$ are output at each sampling on the optical fiber in the absence of external acoustic signals around the optical fiber in the case of emitting optical pulses at a certain frequency. The optical fiber DAS acquisition instrument is an instrument with a phase-sensitive optical time domain reflectometer (φ-OTDR) as a core. The I/Q signals are in-phase and quadrature signals, and it is assumed that there is no external acoustic signals near each sampling on the optical fiber.

S102: DC bias correction is performed on the I/Q signals $I_0$ and $Q_0$ to obtain I/Q signals $I_1$ and $Q_1$ after DC bias correction.

Further, the step that DC bias correction is performed on the I/Q signals $I_0$ and $Q_0$ to obtain I/Q signals $I_1$ and $Q_1$ after DC bias correction includes the following step: Corresponding DC bias factors $D_i$ and $D_q$ are calculated according to a mean value of the I/Q signals $I_0$ and $Q_0$ at different time:

$$D_i = \frac{1}{n}\sum\nolimits_{i=1}^{n} I_0(t_i);$$

$$D_q = \frac{1}{n}\sum\nolimits_{i=1}^{n} Q_0(t_i);$$

wherein $I_0(t_i)$ and $Q_0(t_i)$ are I/Q signals $I_0$ and $Q_0$ at time $t_i$, n is the number of samples for calculation.

DC bias correction is performed on the I/Q signals $I_0$ and $Q_0$ by using the DC bias factors $D_i$ and $D_q$ to obtain the I/Q signals $I_1$ and $Q_1$ after DC bias correction:

$$I_1(t_i) = I_0(t_i) - D_i;$$

$$Q_1(t_i) = Q_0(t_i) - D_q;$$

wherein $I_1(t_i)$ and $Q_1(t_i)$ are I/Q signals $I_1$ and $Q_1$ at time $t_i$.

S103: Amplitude imbalance correction is performed on the I/Q signals $I_1$ and $Q_1$ after DC bias correction by using Hilbert transform to obtain I/Q signals $I_2$ and $Q_2$ after amplitude imbalance correction.

Further, the step that amplitude imbalance correction is performed on the I/Q signals $I_1$ and $Q_1$ after DC bias correction by using Hilbert transform to obtain I/Q signals $I_2$ and $Q_2$ after amplitude imbalance correction includes the following steps: Corresponding instantaneous amplitudes of the I/Q signals $I_1$ and $Q_1$ are calculated by Hilbert transform; and Corresponding amplitude imbalance factors $A_i$ and $A_q$ are calculated according to a mean value of corresponding instantaneous amplitudes at different time:

$$A_i = \frac{1}{n}\sum\nolimits_{i=1}^{n} \sqrt{I_1^2(t_i) + \tilde{I}_1^2(t_i)};$$

$$A_q = \frac{1}{n}\sum\nolimits_{i=1}^{n} \sqrt{Q_1^2(t_i) + \tilde{Q}_1^2(t_i)};$$

wherein $\tilde{I}_1(t_i)$ and $\tilde{Q}_1(t_i)$ are I/Q signals obtained by Hilbert transform on the I/Q signals $I_1(t_i)$ and $Q_1(t_i)$ after DC bias correction, n is the number of samples for calculation.

Amplitude imbalance correction is performed on the I/Q signals $I_1$ and $Q_1$ after DC bias correction according to the amplitude imbalance factors $A_i$ and $A_q$ to obtain the I/Q signals $I_2$ and $Q_2$ after amplitude imbalance correction:

$$I_2(t_i) = I_1(t_i)/A_i;$$

$$Q_2(t_i) = Q_1(t_i)/A_q;$$

wherein $I_2(t_i)$ and $Q_2(t_i)$ are I/Q signals $I_2$ and $Q_2$ at time $t_i$.

S104: Phase imbalance correction is performed on the I/Q signals $I_2$ and $Q_2$ after amplitude imbalance correction by using Hilbert transform to obtain I/Q signals $I_3$ and $Q_3$ after phase imbalance correction.

Further, the step that phase imbalance correction is performed on the I/Q signals $I_2$ and $Q_2$ after amplitude imbalance correction by using Hilbert transform to obtain I/Q signals $I_3$ and $Q_3$ after imbalance correction includes the following steps: Corresponding phases $\psi_i$ and $\psi_q$ are obtained by an arctangent function of a ratio of the I/Q signals $I_2$ and $Q_2$ to the corresponding I/Q signals after Hilbert transform:

$$\psi_i(t_i) = \arctan\left(\frac{\tilde{I}_2(t_i)}{I_2(t_i)}\right);$$

$$\psi_q(t_i) = \arctan\left(\frac{\tilde{Q}_2(t_i)}{Q_2(t_i)}\right);$$

wherein $\tilde{I}_2(t_i)$ and $\tilde{Q}_2(t_i)$ are I/Q signals obtained by Hilbert transform on the I/Q signals $I_2(t_i)$ and $Q_2(t_i)$ after amplitude imbalance correction.

A phase imbalance factor θ is determined by using a mean value of differences of the phases $\psi_i$ and $\psi_q$ at different time:

$$\theta = \frac{1}{n}\sum\nolimits_{i=1}^{n}\left(\psi_q(t_i) - \psi_i(t_i) - \frac{\pi}{2}\right).$$

Phase imbalance correction is performed on the I/Q signals $I_2(t_i)$ and $Q_2(t_i)$ after amplitude imbalance correction according to the phase imbalance factor θ to obtain I/Q signals $I_3(t_i)$ and $Q_3(t_i)$ after imbalance correction:

$$I_3(t_i) = I_2(t_i);$$

$$Q_3(t_i) = \frac{Q_2(t_i) - I_2(t_i)\sin\theta}{\cos\theta}.$$

Then, subsequent phase demodulation and phase unwrapping may be performed by using the above data to obtain a demodulation phase ω and an amplitude Amp, thereby obtaining acoustic wavefield data. The demodulation phase ω and the amplitude Amp are calculated as follows:

$$\omega(t_i) = \arctan\left(\frac{Q_3(t_i)}{I_3(t_i)}\right);$$

$$Amp(t_i) = \sqrt{I_3^2(t_i) + Q_3^2(t_i)}.$$

In an embodiment of the present invention, the DC bias factors $D_i$ and $D_q$, the amplitude imbalance factors $A_i$ and $A_q$, and the phase imbalance factor θ may be obtained by selecting positions without external acoustic signals uniformly after the I/Q signals $I_0$ and $Q_0$ at each sampling on the optical fiber are obtained, and then are applied to all acquired data at all samplings.

Embodiment

Figure 2:
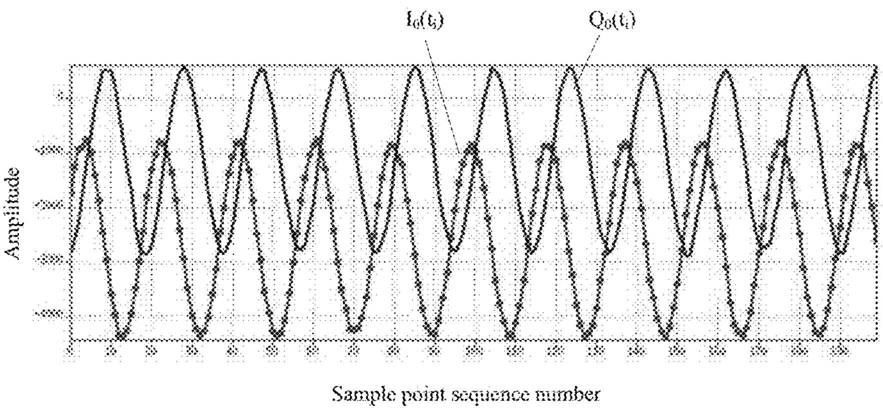
FIG. 2 is a schematic diagram illustrating I/Q signals $I_0(t_i)$ and $Q_0(t_i)$ at sample points when there is no external acoustic signal in a method for correcting imbalance in IQ demodulation of optical fiber DAS data according to an embodiment of the present invention.

A optical fiber DAS acquisition instrument is connected to an optical fiber hung in a cased well, in the case of emitting optical pulses at a repetition rate of 10K, I/Q signals $I_0(t_i)$ and $Q_0(t_i)$ output at time $t_i$(i=1, 2, 3, . . . ) at each sampling on the optical fiber without external acoustic signals around the optical fiber are acquired when a vibroseis is not excited, as shown in FIG. 2.

Corresponding DC bias factors $D_i$ and $D_q$ are calculated according to a mean value of the I/Q signals $I_0(t_i)$ and $Q_0(t_i)$ at multiple points:

$$D_i = \frac{1}{n}\sum\nolimits_{i=1}^{n} I_0(t_i);$$

$$D_q = \frac{1}{n}\sum\nolimits_{i=1}^{n} Q_0(t_i);$$

Figure 3:
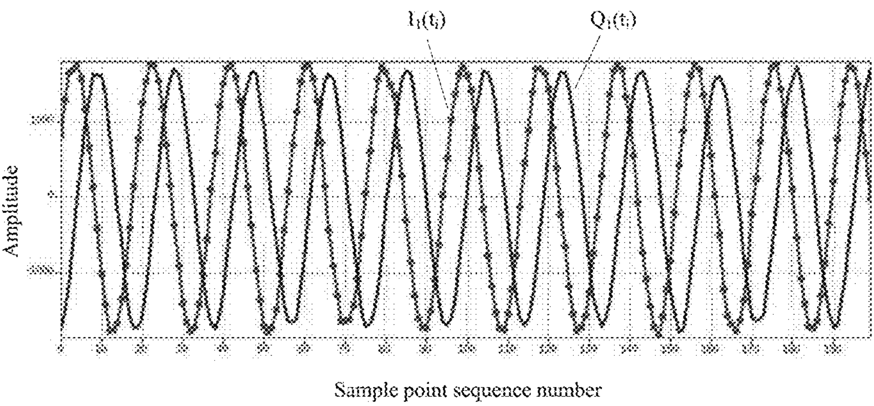
FIG. 3 is a schematic diagram illustrating I/Q signals $I_1(t_i)$ and $Q_1(t_i)$ after DC bias correction in a method for correcting imbalance in IQ demodulation of optical fiber DAS data according to an embodiment of the present invention.

DC bias correction is performed on the I/Q signals $I_0(t_i)$ and $Q_0(t_i)$ by using the DC bias factors $D_i$ and $D_q$ to obtain I/Q signals $I_1(t_i)$ and $Q_1(t_i)$ after DC bias correction, as shown in FIG. 3:

$$I_1(t_i) = I_0(t_i) - D_i;$$

$$Q_1(t_i) = Q_0(t_i) - D_q.$$

Then, corresponding amplitude imbalance factors $A_i$ and $A_q$ are calculated by using Hilbert transform and the I/Q signals $I_1(t)$ and $Q_1(t)$ after DC bias correction:

$$A_i = \frac{1}{n}\sum\nolimits_{i=1}^{n}\sqrt{I_1^2(t_i) + \tilde{I}_1^2(t_i)};$$

$$A_q = \frac{1}{n}\sum\nolimits_{i=1}^{n}\sqrt{Q_1^2(t_i) + \tilde{Q}_1^2(t_i)};$$

wherein $\tilde{I}_1(t_i)$ and $\tilde{Q}_1(t_i)$ are I/Q signals obtained by Hilbert transform on the I/Q signals $I_1(t_i)$ and $Q_1(t_i)$ after DC bias correction.

Figure 4:
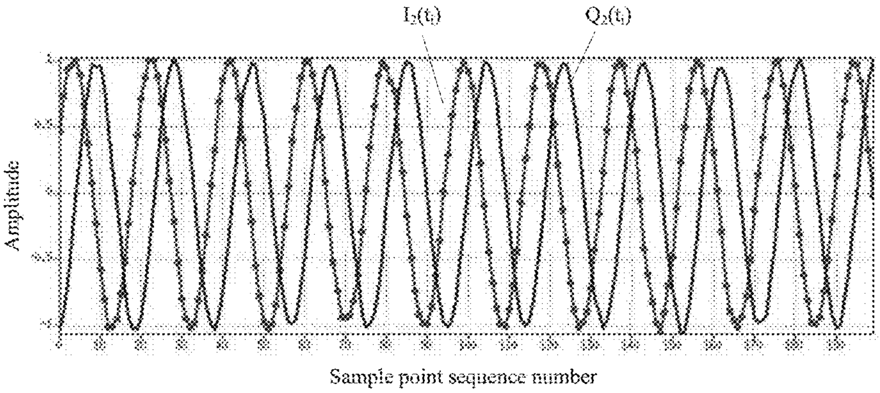
FIG. 4 is a schematic diagram illustrating I/Q signals $I_2(t_i)$ and $Q_2(t_i)$ after amplitude imbalance correction in a method for correcting imbalance in IQ demodulation of optical fiber DAS data according to an embodiment of the present invention.

Amplitude imbalance correction is performed on the I/Q signals $I_1(t_i)$ and $Q_1(t_i)$ after DC bias correction according to the amplitude imbalance factors $A_i$ and $A_q$ to obtain I/Q signals $I_2(t_i)$ and $Q_2(t_i)$ after amplitude imbalance correction, as shown in FIG. 4:

$$I_2(t_i) = I_1(t_i)/A_i;$$

$$Q_2(t_i) = Q_1(t_i)/A_q.$$

Figure 5:
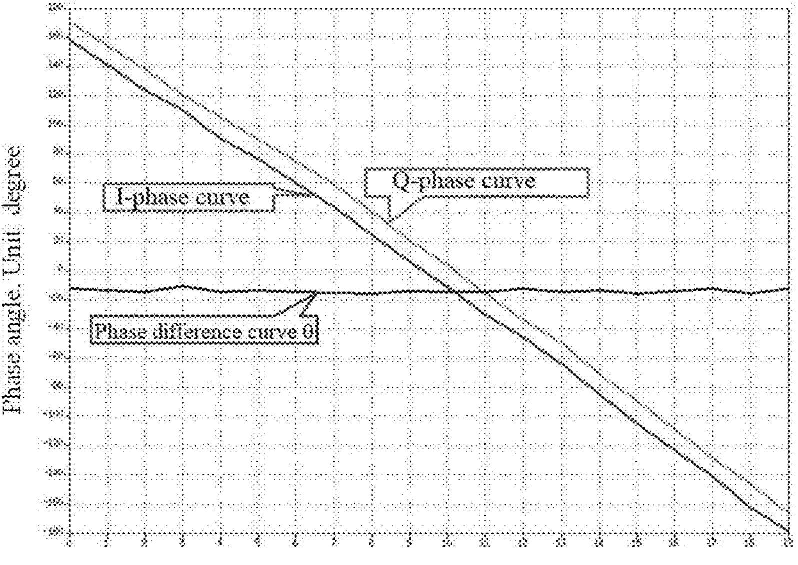
FIG. 5 is a schematic diagram illustrating a phase curve and a phase difference curve of I/Q signals obtained by Hilbert transform in a method for correcting imbalance in IQ demodulation of optical fiber DAS data according to an embodiment of the present invention.

Then, phases $\psi_i(t_i)$ and $\psi_q(t_i)$ corresponding to the I/Q signals $I_2(t_i)$ and $Q_2(t_i)$ are calculated by using Hilbert transform and the I/Q signals $I_2(t_i)$ and $Q_2(t_i)$ after amplitude imbalance correction, as shown in FIG. 5:

$$\psi_i(t_i) = \arctan\left(\frac{\tilde{I}_2(t_i)}{I_2(t_i)}\right);$$

$$\psi_q(t_i) = \arctan\left(\frac{\tilde{Q}_2(t_i)}{Q_2(t_i)}\right);$$

wherein, $\tilde{I}_2(t_i)$ and $\tilde{Q}_2(t_i)$ are I/Q signals obtained by Hilbert transform on I/Q signals $I_2(t_i)$ and $Q_2(t_i)$ after amplitude imbalance correction.

Referring to FIG. 5, a phase imbalance factor is calculated according to the phases $\psi_i(t_i)$ and $\psi_q(t_i)$ corresponding to the I/Q signals, and the I/Q signals themselves are quadrature signals, and have a phase difference $$\frac{\pi}{2},$$

so that the phase imbalance factor (phase difference) θ is:

$$\theta = \frac{1}{n}\sum\nolimits_{i=1}^{n}\left(\psi_q(t_i) - \psi_i(t_i) - \frac{\pi}{2}\right).$$

In this embodiment, the mean value of the phase difference is −14 degrees.

Figure 6:
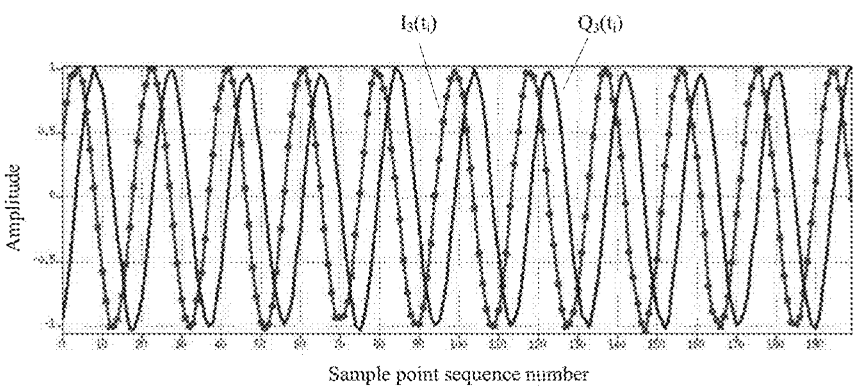
FIG. 6 is a schematic diagram illustrating I/Q signals $I_3(t_i)$ and $Q_3(t_i)$ after imbalance correction in a method for correcting imbalance in IQ demodulation of optical fiber DAS data according to an embodiment of the present invention.
Figure 7:
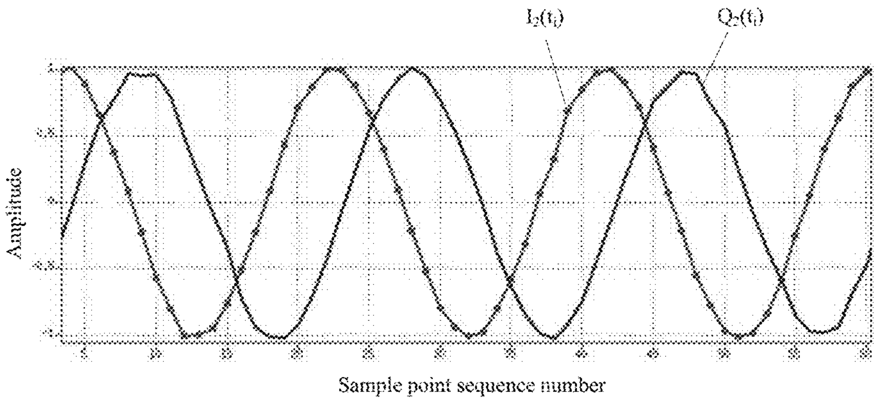
FIG. 7 is a zoomed view illustrating I/Q signals $I_2(t_i)$ and $Q_2(t_i)$ after amplitude imbalance correction in a method for correcting imbalance in IQ demodulation of optical fiber DAS data according to an embodiment of the present invention.
Figure 8:
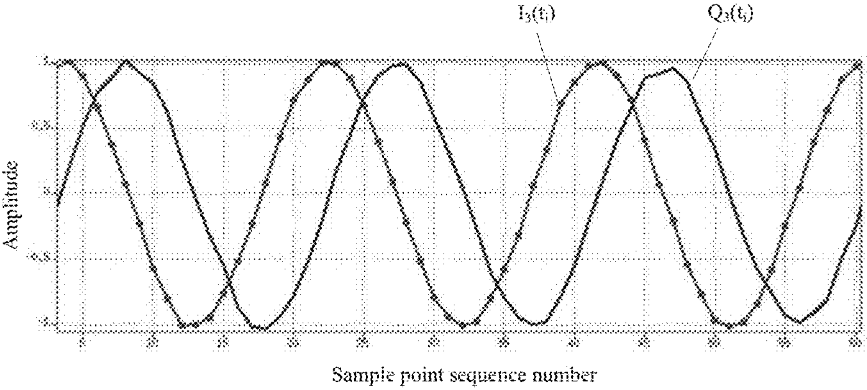
FIG. 8 is a partially enlarged view illustrating I/Q signals $I_3(t_i)$ and $Q_3(t_i)$ after phase imbalance correction in a method for correcting imbalance in IQ demodulation of optical fiber DAS data according to an embodiment of the present invention.

Phase imbalance correction is performed on the I/Q signals $I_2(t_i)$ and $Q_2(t_i)$ after amplitude imbalance correction according to the phase imbalance factor to obtain I/Q signals $I_3(t_i)$ and $Q_3(t_i)$ after imbalance correction, as shown in FIGS. 6-8, wherein FIG. 7 and FIG. 8 are zoomed views of the I/Q signals before and after phase imbalance correction:

$$I_3(t_i) = I_2(t_i);$$

$$Q_3(t_i) = \frac{Q_2(t_i) - I_2(t_i)\sin\theta}{\cos\theta}.$$

Subsequent phase demodulation and phase unwrapping may be performed by using the above data after the I/Q signals imbalance correction are obtained so as to obtain a demodulation phase ω and an amplitude Amp, thereby obtaining acoustic wavefield data. The demodulation phase ω and the amplitude Amp are calculated as follows:

$$\omega(t_i) = \arctan\left(\frac{Q_3(t_i)}{I_3(t_i)}\right);$$

$$Amp(t_i) = \sqrt{I_3^2(t_i) + Q_3^2(t_i)}.$$

Figure 9:
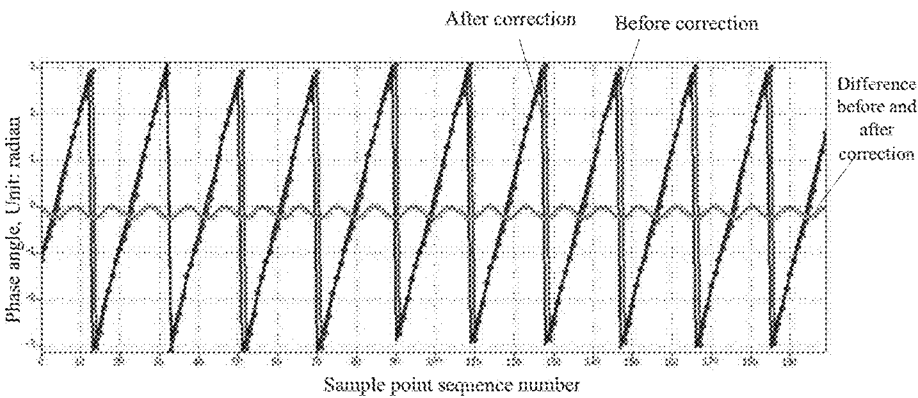
FIG. 9 is a schematic diagram illustrating a demodulation phase curve and a demodulation phase difference curve before and after imbalance correction in a method for correcting imbalance in IQ demodulation of optical fiber DAS data according to an embodiment of the present invention.
Figure 10:
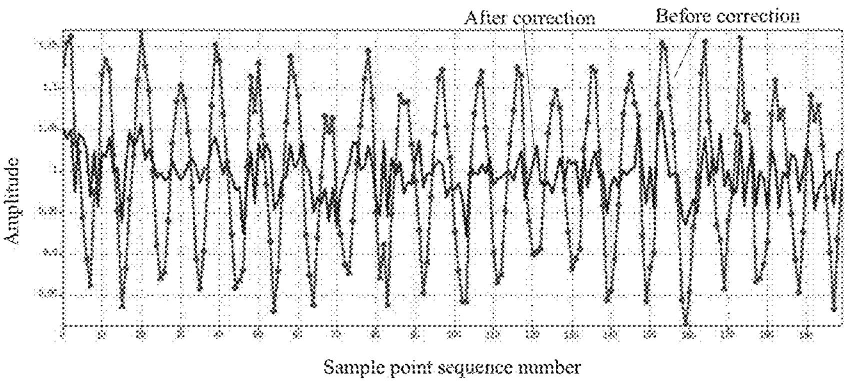
FIG. 10 is a schematic diagram illustrating amplitude curves before and after imbalance correction in a method for correcting imbalance in IQ demodulation of optical fiber DAS data according to an embodiment of the present invention.
Figure 11:
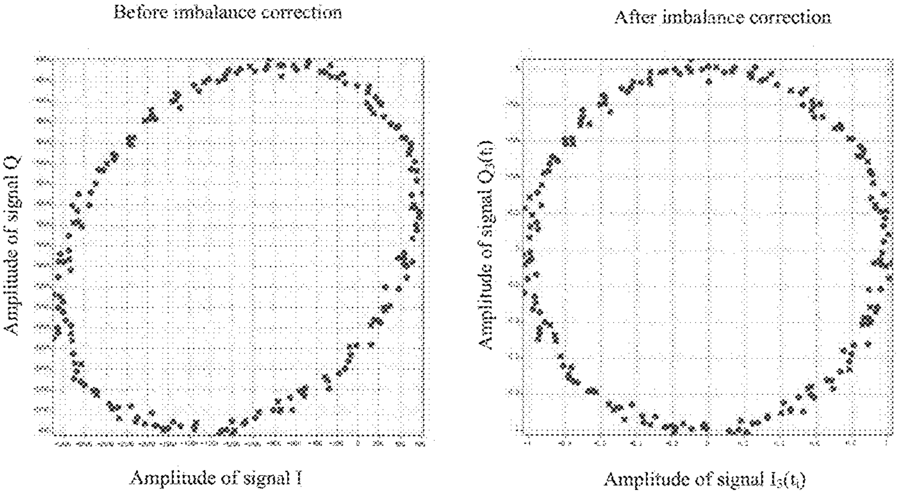
FIG. 11 is a schematic diagram illustrating I/Q cross plots before and after imbalance correction in a method for correcting imbalance in IQ demodulation of optical fiber DAS data according to an embodiment of the present invention.
Figure 12:
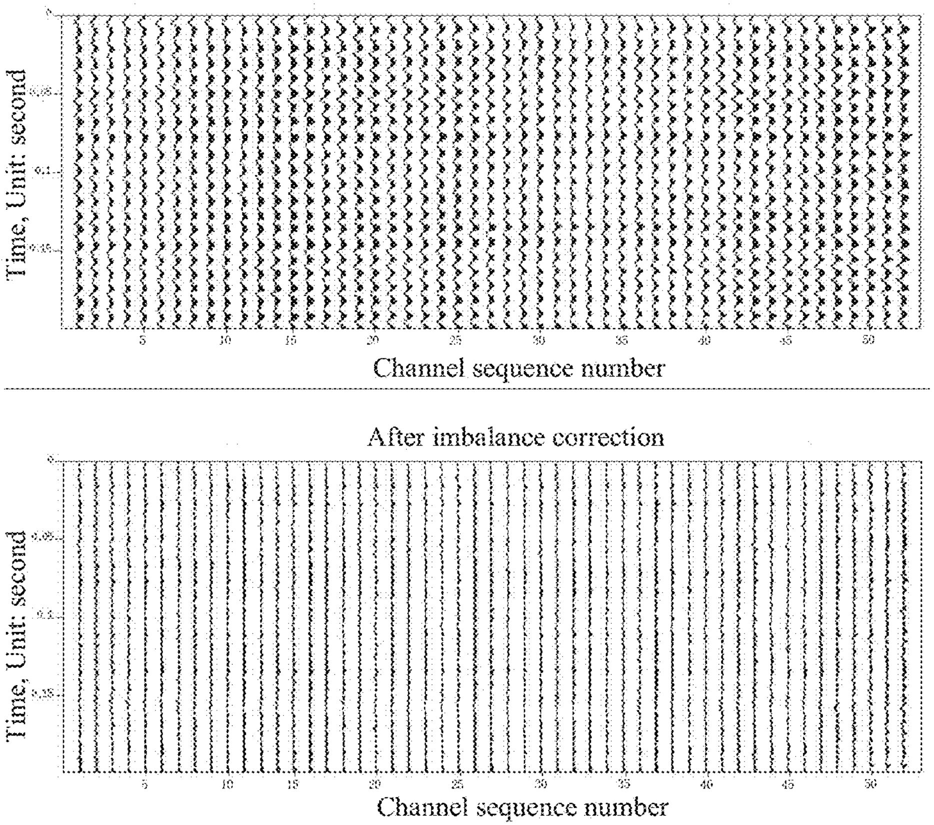
FIG. 12 is a schematic diagram illustrating IQ demodulation background noise before and after imbalance correction in a method for correcting imbalance in IQ demodulation of optical fiber DAS data according to an embodiment of the present invention.
Figure 13:
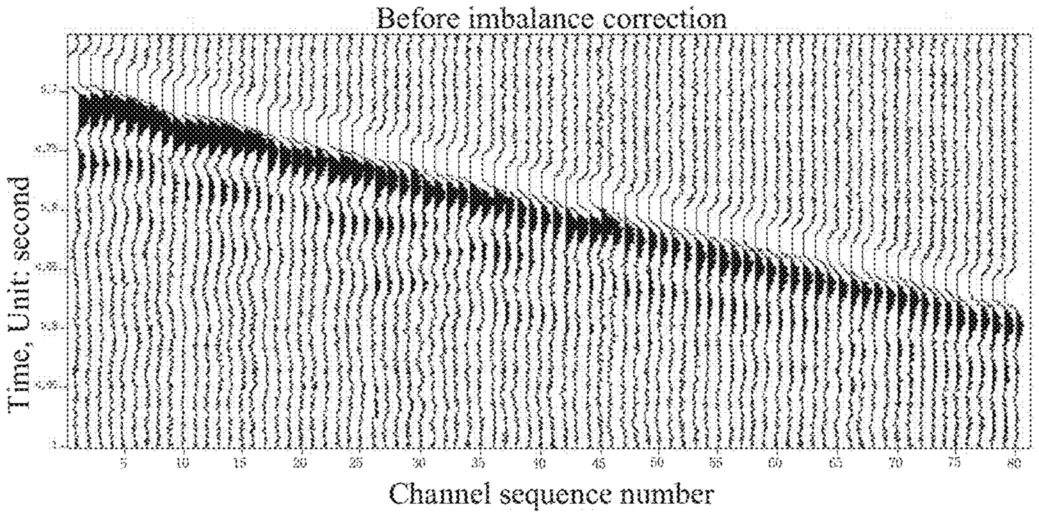
FIG. 13 is a schematic diagram illustrating IQ demodulation seismic wavefields before and after imbalance correction in a method for correcting imbalance in IQ demodulation of optical fiber DAS data according to an embodiment of the present invention.
Figure 13:
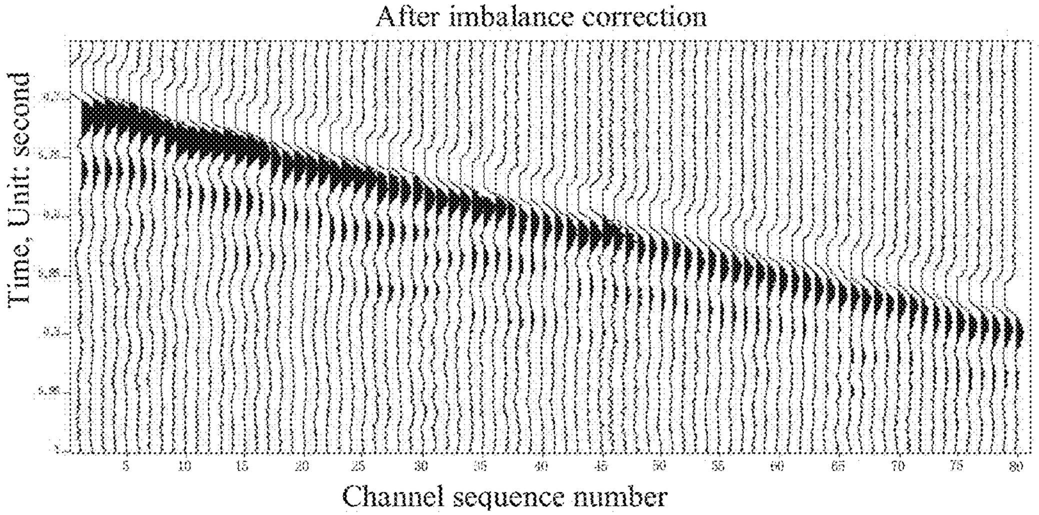

Referring to FIG. 9-FIG. 12, a demodulation phase curve and a demodulation phase difference curve before and after phase imbalance correction are as shown in FIG. 9. Amplitude curves before and after phase imbalance correction are as shown in FIG. 10. I/Q crossplots before and after imbalance correction are as shown in FIG. 11, and it can be seen that the crossplot is elliptical before correction and is circular after correction. IQ demodulation background noise before and after imbalance correction is as shown in FIG. 12, and the noise level is reduced by 60% or above by the method of the present invention. IQ demodulation seismic wavefields before and after imbalance correction are as shown in FIG. 13, and a signal-to-noise ratio is improved by 3-4 times by the method of the present invention.

Figure 14:
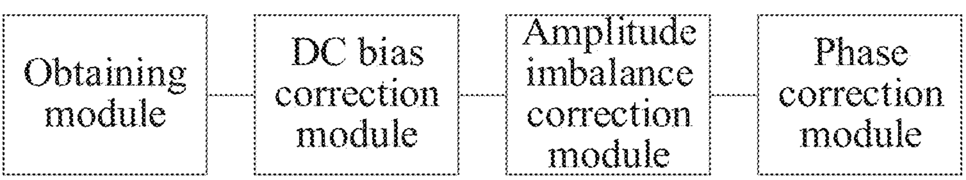
FIG. 14 is a schematic diagram illustrating a system for correcting imbalance in IQ demodulation of optical fiber DAS data according to an embodiment of the present invention.

Referring to FIG. 14, the present invention, in a second aspect, provides a system for correcting imbalance in IQ demodulation of optical fiber DAS data. The system includes: an obtaining module, configured to obtain I/Q signals $I_0$ and $Q_0$ of each sampling on an optical fiber; a DC bias correction module, configured to perform DC bias correction on the I/Q signals $I_0$ and $Q_0$ to obtain I/Q signals $I_1$ and $Q_1$ after DC bias correction; an amplitude imbalance correction module, configured to perform amplitude imbalance correction on the I/Q signals $I_1$ and $Q_1$ after DC bias correction by using Hilbert transform to obtain I/Q signals $I_2$ and $Q_2$ after amplitude imbalance correction; and a phase imbalance correction module, configured to perform phase imbalance correction on the I/Q signals $I_2$ and $Q_2$ after amplitude imbalance correction by using Hilbert transform to obtain I/Q signals $I_3$ and $Q_3$ after phase imbalance correction.

The preferred embodiments of the present invention are described above in detail in combination with the drawings, but the present invention is not limited to the specific details in the above embodiments. Various simple variations can be made to the technical solutions of the present invention in the scope of the technical concept of the present invention, and these simple variations all fall within the protection scope of the present invention.

In addition, it should be noted that the specific technical features described in the above specific embodiments can be combined in any appropriate mode under the non-contradictory condition, and various possible combination modes will not be described separately in order to avoid unnecessary repetition.

Furthermore, various different embodiments of the present invention can also be combined optionally, and the combinations also should be regarded as the content disclosed by the present invention as long as the combinations do not violate the concept of the present invention.

The invention claimed is:

1. A method for correcting imbalance in IQ demodulation of optical fiber DAS data, comprising:

obtaining I/Q signals $I_0$ and $Q_0$ of each sampling;

performing DC bias correction on the I/Q signals $I_0$ and $Q_0$ to obtain I/Q signals $I_1$ and $Q_1$ after DC bias correction;

performing amplitude imbalance correction on the I/Q signals $I_1$ and $Q_1$ after DC bias correction by using Hilbert transform to obtain I/Q signals $I_2$ and $Q_2$ after amplitude imbalance correction; and performing phase imbalance correction on the I/Q signals $I_2$ and $Q_2$ after amplitude imbalance correction by using Hilbert transform to obtain I/Q signals $I_3$ and $Q_3$ after phase imbalance correction, wherein the step of performing amplitude imbalance correction on the I/Q signals $I_1$ and $Q_1$ after DC bias correction by using Hilbert transform to obtain I/Q signals $I_2$ and $Q_2$ after amplitude imbalance correction comprises:

calculating corresponding amplitude imbalance factors $A_i$ and $A_q$ by using Hilbert transform and the I/Q signals $I_1$ and $Q_1$ after DC bias correction; and performing amplitude imbalance correction on the I/Q signals $I_1$ and $Q_1$ after DC bias correction according to the amplitude imbalance factors $A_i$ and $A_q$ to obtain the I/Q signals $I_2$ and $Q_2$ after amplitude imbalance correction.

2. The method according to claim 1, wherein the step of performing DC bias correction on the I/Q signals $I_0$ and $Q_0$ to obtain I/Q signals $I_1$ and $Q_1$ after DC bias correction comprises:

calculating corresponding DC bias factors $D_i$ and $D_q$ according to the I/Q signals $I_0$ and $Q_0$; and performing DC bias correction on the I/Q signals $I_0$ and $Q_0$ by using the DC bias factors $D_i$ and $D_q$ to obtain the I/Q signals $I_1$ and $Q_1$ after DC bias correction.

3. The method according to claim 2, wherein the step of calculating corresponding DC bias factors $D_i$ and $D_q$ according to the I/Q signals $I_0$ and $Q_0$ comprises:

calculating the corresponding DC bias factors $D_i$ and $D_q$ according to a mean value of the I/Q signals $I_0$ and $Q_0$ at different time.

4. The method according to claim 1, wherein the step of calculating corresponding amplitude imbalance factors $A_i$ and $A_q$ by using Hilbert transform and the I/Q signals $I_1$ and $Q_1$ after DC bias correction comprises:

calculating corresponding instantaneous amplitudes of the I/Q signals $I_1$ and $Q_1$ by Hilbert transform; and calculating the corresponding amplitude imbalance factors $A_i$ and $A_q$ according to a mean value of corresponding instantaneous amplitudes at different time.

5. The method according to claim 1, wherein the step of performing phase imbalance correction on the I/Q signals $I_2$ and $Q_2$ after amplitude imbalance correction by using Hilbert transform to obtain I/Q signals $I_3$ and $Q_3$ after imbalance phase correction comprises:

calculating phases $\psi_i$ and $\psi_q$ corresponding to the I/Q signals $I_2$ and $Q_2$ by using Hilbert transform and the I/Q signals $I_2$ and $Q_2$ after amplitude imbalance correction;

calculating a phase imbalance factor $\theta$ according to the phases $\psi_i$ and $\psi_q$ corresponding to the I/Q signals $I_2$ and $Q_2$; and performing phase imbalance correction on the I/Q signals $I_2$ and $Q_2$ after amplitude imbalance correction according to the phase imbalance factor $\theta$ to obtain the I/Q signals $I_3$ and $Q_3$ after phase imbalance correction.

6. The method according to claim 4, wherein the step of calculating phases $\psi_i$ and $\psi_q$ corresponding to the I/Q signals $I_2$ and $Q_2$ by using Hilbert transform and the I/Q signals $I_2$ and $Q_2$ after amplitude imbalance correction comprises:

obtaining the corresponding phases $\psi_i$ and $\psi_q$ by an arctangent function of a ratio of the I/Q signals $I_2$ and $Q_2$ to the corresponding I/Q signals after Hilbert transform.

7. The method according to claim 4, wherein the step of calculating a phase imbalance factor $\theta$ according to the phases $\psi_i$ and $\psi_q$ corresponding to the I/Q signals comprises:

determining the phase imbalance factor $\theta$ by using a mean value of differences of the phases $\psi_i$ and $\psi_q$ at different time.

8. The method according to claim 4, wherein performing phase imbalance correction on the I/Q signals $I_2$ and $Q_2$ after amplitude imbalance correction according to the phase imbalance factor $\theta$ by the following manner to obtain the I/Q signals $I_3$ and $Q_3$ after phase imbalance correction:

$$I_3 = I_2;$$

$$Q_3 = \frac{Q_2 - I_2 \sin\theta}{\cos\theta}.$$

9. A system for correcting imbalance in IQ demodulation of optical fiber DAS data, comprising:

an obtaining module, configured to obtain I/Q signals $I_0$ and $Q_0$ of each sampling on an optical fiber;

a DC bias correction module, configured to perform DC bias correction on the I/Q signals $I_0$ and $Q_0$ to obtain I/Q signals $I_1$ and $Q_1$ after DC bias correction;

an amplitude imbalance correction module, configured to perform an amplitude imbalance correction on the I/Q signals $I_1$ and $Q_1$ after DC bias correction by using Hilbert transform to obtain I/Q signals $I_2$ and $Q_2$ after amplitude imbalance correction; and a phase imbalance correction module, configured to perform phase imbalance correction on the I/Q signals $I_2$ and $Q_2$ after amplitude imbalance correction by using Hilbert transform to obtain I/Q signals $I_3$ and $Q_3$ after phase imbalance correction, wherein the performing an amplitude imbalance correction on the I/Q signals $I_1$ and $Q_1$ after DC bias correction by using Hilbert transform to obtain I/Q signals $I_2$ and $Q_2$ after amplitude imbalance correction comprises:

calculating corresponding amplitude imbalance factors $A_i$ and $A_q$ by using Hilbert transform and the I/Q signals $I_1$ and $Q_1$ after DC bias correction; and performing the amplitude imbalance correction on the I/Q signals $I_1$ and $Q_1$ after DC bias correction according to the amplitude imbalance factors $A_i$ and $A_q$ to obtain the I/Q signals $I_2$ and $Q_2$ after amplitude imbalance correction.

* * * * *